May 19, 1953  H. A. CLINE  2,639,366
AIRPORT RUNWAY MARKER LIGHT
Original Filed May 23, 1946
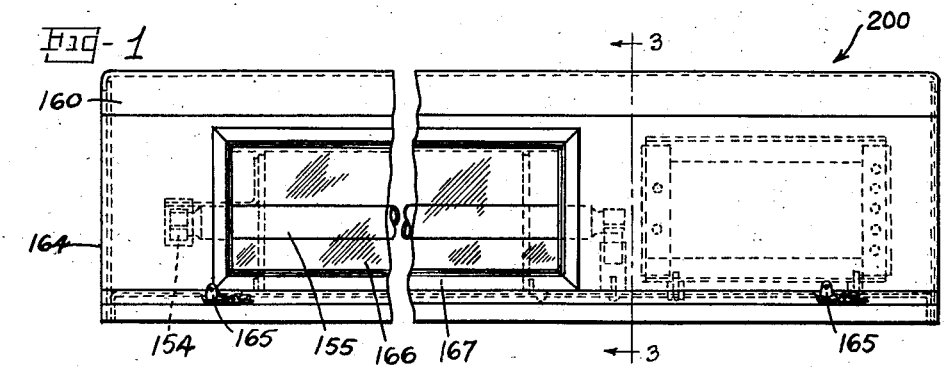
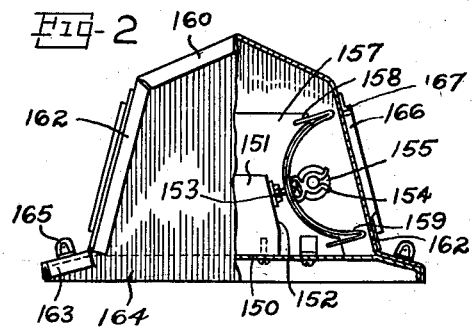
INVENTOR
Harold A. Cline
BY
Wallace and Cannon
ATTORNEYS Patented May 19, 1953

2,639,366

UNITED STATES PATENT OFFICE 2,639,366

AIRPORT RUNWAY MARKER LIGHT

Harold A. Cline, Dayton, Ohio, assignor to Emarco Corporation, Dayton, Ohio, a corporation of Illinois Original application May 23, 1946, Serial No. 671,696. Divided and this application November 5, 1948, Serial No. 58,420

2 Claims. (Cl. 240—1.2)

This application is a division of my co-pending application, Serial No. 671,696, filed May 23, 1946, and issued December 19, 1951, as U. S. Patent No. 2,602,850, which describes an airport lighting system and which is herein incorporated by reference.

This invention relates to light sources for aircraft landing fields and more particularly to light sources of the type that are especially well adapted for marking the end of a runway of such a field.

As discussed in greater detail in the aforementioned application, in the operation of aircraft, it is of primary importance to provide a reliable lighting system by means of which the pilot can be assured of making a safe landing of the aircraft, especially under conditions which approach the limiting conditions of visibility and ceiling.

The safety of the landing field relative to take-offs and landings can be improved materially, both for daylight flying and particularly for night operations, by the use of properly constructed and arranged lights for marking the end of landing strip. The use of a high intensity beam directed toward the approaching aircraft has not proven to be highly successful and may even create a serious flight hazard.

It is accordingly the principal object of my invention to afford a novel light unit which is especially well adapted for marking the ends of a runway and to clearly identify such positions to a pilot of an aircraft engaged either in landing on, or taking off from, the runway.

Other objects and advantages of the invention will be apparent from the following description, the accompanying drawings and the appended claims.

In the drawings, which illustrate a preferred embodiment of the invention—

Fig. 1 is a broken side elevational view of a unit adapted for marking the end of a runway or landing field; and Fig. 2 is a view partially in end elevation and partially in vertical section on line 3—3 of Fig. 2.

In Figs. 1 and 2 is shown a light unit 200 which comprises a preferred embodiment of my present invention, and which is especially well adapted for marking the ends of a runway or the end of a landing field, in order clearly to identify such positions to the pilot. The unit 200 comprises a base 150 on which there is mounted an elongated tube support 151 having inclined opposite side faces 152 on which are mounted bolts 153 for supporting the tube brackets 154 which are mounted adjacent either end of the unit 200. Gaseous discharge tubes 155 of a character adapted for use in my device are mounted in the brackets 154 at either side of the support 151.

The tubes 155 preferably are of the type containing inert gases such as neon, krypton or the like, and preferably are constructed to carry normal energizing currents substantially in excess of those customary with the neon lights as used in signs, etc. In the latter case a discharge current of the order of .015 to about .060 ampere is commonly used, but it has been found that improved results are obtained with a greater light intensity where this current is increased up to several hundred milliamperes, varying up to ½ an ampere or more. While the increase in the total light developed is not directly proportional to the increase in current, the use of these higher current values has been found to be highly advantageous as providing for a solid column of light of the controlled high but non-blinding intensity. A suitable electrode construction for use in such tubes is shown in United States Letters Patent No. 2,061,390, granted to Daniel S. Stevens, November 17, 1936, the tubes themselves being preferably formed of heat resisting glass such as quartz, Pyrex, lead glass or the like to provide the desired strength and heat resistance.

The selection of the gas is of substantial importance as providing for the development of light of the proper wave length to have the desired high penetrative power so that it will largely pass through mist or fog without being absorbed.

A supporting assembly 157 is also provided at either end of the casing and is notched as shown at 158 to receive reflectors 159 therein. A sheet metal casing 160 having apertured side walls 162 and an open bottom is removably received over the base 150. The casing includes end walls 164 suitably secured as by welding the turned over flanges 163 of the side walls thereto. Clips 165 provide for detachably securing the housing in assembled position on the base.

The apertures in the side wall opposite the tubes 155 are enclosed by glass plates 166 which are held in position by flanges 167, the plates being suitably secured thereto with waterproofing material so that the entire assembly is weatherproof.

If desired the tubes on opposite sides of the unit may be of the same color or one may develop a red light and the other a green light. In the latter case the unit may advantageously be placed so that the green light appears to the pilot coming into the runway, and so that he will have a definite marker for the end of the runway and know that having passed such light the plane can be safely landed. At least one and preferably a plurality of such units are located in a line extending across the end of the runway. When leaving either end of the runway, only the red light would be observed and the pilot would thus be warned of the exact location where it was necessary to get the plane off the runway. With the construction shown it is not possible to see both lights at once and the pilot sees either a red or green light depending upon whether he is leaving or approaching the runway.

For this purpose, when a source of red light is desired, it has been found advantageous to use neon tubes, the neon forming a source of red light which has greater penetrative power than light of a shorter wave length. The development of red light at the source is highly desirable in that it provides much greater light efficiency than is possible where a white light source is utilized in conjunction with red filters for removing light of other colors.

Where a light of green color is desired, such as, for example, for marking the end of the runway on the approach side thereof, a tube containing mercury vapor and operating in the aforementioned increased current range may be employed, providing for the development of a high efficiency source of green light.

In the operation of the system shown herein, the operator in the control tower will select a particular runway on which it is desired to have the incoming plane land, as determined by prevailing wind conditions. At the same time the unit or units 200 across the approach end of the selected runway are energized, showing green toward the incoming aircraft. The usual wind tetrahedron or direction indicator may also be outlined by a series of the elongated gaseous discharge tube lights of this invention and this also supplements the other landing equipment in showing the proper direction for landing.

From the foregoing, it will be apparent that I have provided a novel light unit which is practical and efficient in operation and construction; may be economically constructed commercially; and affords a novel light source adapted to indicate the end of a runway in a novel and expeditious manner.

Thus, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:
1. A light source of the type adapted to mark the end of a runway and comprising a base, an elongated supporting member mounted on said base and having inclined opposite side faces, two elongated gaseous discharge tubes, each of said tubes being mounted on a corresponding one of said side faces of said supporting member in parallel relation to said corresponding side face, and to said base, reflectors mounted between said tubes and said supporting member for directing light from said tubes in opposite directions and away from each other, each of said reflectors comprising an elongated cup-shaped member having a closed side and an open side and being mounted between a respective one of said tubes and said corresponding face of said supporting member with said open side disposed in parallel relation to said last mentioned face of said supporting member, and a housing mounted on said base and enclosing said tubes and said reflectors, said housing having two windows therein and a top wall separating said windows, each of said windows being disposed adjacent to the said open side of one of said reflectors in parallel relation to said open side on the side of said reflector opposite to that at which said corresponding face of said supporting member is disposed.

2. A runway marker light for an airfield comprising an elongated base plate adapted to be mounted in substantially flat horizontal position on the end of a runway and in transversely extending relation to the length of said runway, two elongated reflectors mounted on said base, each of said reflectors comprising an elongated cup-shaped member having a closed side and an open side and being mounted along a respective longitudinal edge of said base in substantially spaced parallel relation thereto with said open side facing outwardly and upwardly therefrom, two elongated gaseous discharge tubes mounted on said base, each of said tubes being disposed outwardly of said reflectors in parallel relation thereto, and a housing mounted on said base enclosing said tubes and said reflectors, said housing having two windows therein and a top wall separating said windows, each of said windows being disposed adjacent to and outwardly of said open side of a corresponding one of said reflectors.

HAROLD A. CLINE.

References Cited in the file of this patent

UNITED STATES PATENTS

| Number | Name | Date |
|---|---|---|
| 1,961,116 | Vloten | May 29, 1934 |
| 2,191,379 | Glasgow | Feb. 20, 1940 |
| 2,283,782 | Ashley et al. | May 19, 1942 |
| 2,431,240 | Gausch | Nov. 18, 1947 |

FOREIGN PATENTS

| Number | Country | Date |
|---|---|---|
| 293,876 | England | Oct. 14, 1929 |
| 537,898 | England | July 11, 1941 |
| 560,974 | England | Apr. 28, 1944 |
| 783,540 | France | Apr. 8, 1935 |